(12) United States Patent
Williams et al.

(10) Patent No.: US 6,631,781 B2
(45) Date of Patent: Oct. 14, 2003

(54) METHOD AND APPARATUS FOR CONTROLLING AN ELECTRIC POWERED ASSISTED STEERING SYSTEM USING AN ADAPTIVE BLENDING TORQUE FILTER

(75) Inventors: Andrew James Stephen Williams, Solihull (GB); Russell Wilson Jones, Stratford-upon-Avon (GB); Anthony Walter Burton, Solihull (GB); Simon David Stevens, West Midlands (GB); Kevin McLaughlin, Troy, MI (US)

(73) Assignee: TRW Lucas Varity Electric Steering, Ltd. (GB)

( * ) Notice: Subject to any disclaimer, the term of this patent is extended or adjusted under 35 U.S.C. 154(b) by 0 days.

(21) Appl. No.: 10/077,594

(22) Filed: Feb. 15, 2002

(65) Prior Publication Data

US 2003/0024759 A1 Feb. 6, 2003

Related U.S. Application Data

(63) Continuation of application No. PCT/GB00/03166, filed on Aug. 17, 2000.

(30) Foreign Application Priority Data

Aug. 17, 1999 (GB) ................................................ 9919277

(51) Int. Cl.$^7$ ................................................ H02P 7/00
(52) U.S. Cl. .................. 180/443; 180/446; 318/432
(58) Field of Search ................................ 180/443, 446, 180/422, 423; 701/41, 42; 318/432

(56) References Cited

U.S. PATENT DOCUMENTS

| | | | |
|---|---|---|---|
| 4,875,541 A | | 10/1989 | Oshita et al. |
| 5,504,403 A | | 4/1996 | McLaughlin |
| 5,704,446 A | | 1/1998 | Chandy et al. |
| 5,743,351 A | * | 4/1998 | McLaughlin ................. 180/446 |
| 5,919,241 A | * | 7/1999 | Bolourchi et al. ............. 701/41 |
| 5,992,556 A | * | 11/1999 | Miller ........................ 180/446 |
| 6,046,560 A | * | 4/2000 | Lu et al. ..................... 318/432 |
| 6,091,214 A | * | 7/2000 | Yamawaki et al. ........... 318/52 |
| 6,104,152 A | * | 8/2000 | Coles et al. ................. 318/254 |
| 6,107,767 A | * | 8/2000 | Lu et al. ..................... 318/561 |
| 6,295,879 B1 | * | 10/2001 | Miller et al. ............. 73/862.08 |

FOREIGN PATENT DOCUMENTS

| | | |
|---|---|---|
| EP | 0 683 086 | 11/1995 |
| EP | 0 842 841 | 5/1998 |

* cited by examiner

Primary Examiner—Lesley D. Morris
Assistant Examiner—Tony Winner
(74) Attorney, Agent, or Firm—MacMillan, Sobanski & Todd, LLC

(57) ABSTRACT

An apparatus and method for controlling an electric steering assist system, which system provides assist in response to a steering control signal, the apparatus comprising: torque sensing means (20) operatively connected to a vehicle hand wheel (12) for providing a torque signal (Ts) indicative of applied steering torque, blending filter means connected to the torque sensing means (20) for providing a blended filtered torque signal having a first functional characteristic at torque frequencies less than a blending frequency and a second functional characteristic at torque frequencies greater than the blending frequency, the blending filter means including a low pass filter (70) which passes all frequencies below the blending frequency and a high pass filter (71) which passes all frequencies above the blending frequency, steering assist means for providing steering assist in response to a control signal, control means operatively connected to the blending filter means for providing said control signal to the steering assist means in response to the blended filtered torque signal, and means (166) whereby high frequency gain of the steering assist system is arranged to be low for on-center operation of the hand wheel and relatively higher for off-center operation.

12 Claims, 11 Drawing Sheets

METHOD AND APPARATUS FOR CONTROLLING AN ELECTRIC POWERED ASSISTED STEERING SYSTEM USING AN ADAPTIVE BLENDING TORQUE FILTER

CROSS REFERENCE TO RELATED APPLICATIONS

This application is a continuation of International Application No. PCT/GB00/03166 filed Aug. 17, 2000, which claims priority to Great Britain Patent Application No. 9919277.5 filed Aug. 17, 1999.

BACKGROUND OF THE INVENTION

The present invention is concerned with a method and apparatus for controlling an electric power assisted steering system in a motor vehicle and of the type which uses an adaptive blending torque filter to improve steering feel.

Electric assist steering systems are well known in the art. Electric power assist steering systems that utilize a rack and pinion gear set provide power assist by using an electric motor to either (1) apply rotary force to a steering shaft connected to a pinion gear, or (2) apply linear force to a steering member having the rack teeth thereon. The electric motor in such systems is typically controlled in response to (1) a driver's applied torque to the vehicle steering wheel, and (2) sensed vehicle speed.

Known electric assist steering systems have a dynamic performance characteristic, known as the system bandwidth, that varies as a function of vehicle speed. As the vehicle operator applies steering torque and rotates the steering wheel back and forth, e.g. left-to-right-to-left, the electric assist motor is energized to provide steering assist commensurate with the steering inputs. How the steering system responds to a particular frequency of back-and-forth steering wheel movement is indicative of the system's dynamic performance.

The amount of local change at the electric assist motor divided by the amount of local change in steering torque applied by the driver is the steering system gain. A time delay occurs from the time steering torque is applied to the steering wheel to the time the assist motor responds. This time delay is a friction of the frequency at which the input command is applied. This is referred to as the system response time. The system gain is set to a predetermined value so as to have a short system response time while still maintaining overall system stability. The system response time and system gain determine the system bandwidth.

The bandwidth in known steering systems varies as a function of vehicle speed. If dynamic steering frequency or the "frequency" of a transient response exceeds the system bandwidth at a particular vehicle speed, the steering feel becomes "sluggish" (felt as a "hesitation"when the steering wheel direction is changed) since the steering assist motor does not respond quick enough. Typically, steering system gain as well as system bandwidth decreases as the vehicle speed increases so that system hesitation or sluggishness becomes more noticeable as vehicle speed increases.

According to our earlier U.S. Pat. No. 5,504,403, which is incorporated by reference herein, it is known for the power assist apparatus to comprise torque sensing means operatively connected to a vehicle hand wheel for providing a torque signal indicative of applied steering torque. Blending filter means are connected to the torque sensing means for providing a blended filtered torque signal having a first functional characteristic at torque frequencies less than a blending frequency and a second functional characteristic at torque frequencies greater than the blending frequency. The apparatus further includes steering assist means for providing steering assist in response to a control signal, and control means operatively connected to the blending filter means for providing said control signal to the steering assist means in response to the blended filtered torque signal. The blending filtering means filters the torque signal so as to maintain a selectable system bandwidth during system operation.

Similarly, according to a later U.S. Pat. No. 5,704,446, which is incorporated by reference herein, a blending filter is provided for splitting the driver torque signal into a low frequency component and a high frequency component. However a further feature is provided where the low frequency component sets the high frequency gain. This is so that the gain for the high frequency component signal mirrors the effective gain of the low frequency component signal, whereby the high frequency signal is close to but always slightly higher than the low frequency signal. As this makes the high frequency gain a function of the amplitude of the low frequency torque signal component, a phase lag is introduced into the high frequency component above the blending frequency which itself could induce instability within the system.

It is an object of the present invention to provide blended filtering of the high and low frequency torques present within the steering system that ensures stability and improved driver feel under all operating conditions.

It is a feature of the present invention to seek to further optimize the torque blending operation in the aforegoing systems.

SUMMARY OF THE INVENTION

In accordance with the present invention, there is provided an apparatus for controlling an electric steering assist system, which system provides assist in response to a steering control signal, the apparatus comprising: torque sensing means operatively connected to a vehicle hand wheel for providing a torque signal indicative of applied steering torque, blending filter means connected to the torque sensing means for providing a blended filtered torque signal having a first functional characteristic at torque frequencies less than a blending frequency and a second functional characteristic at torque frequencies greater than the blending frequency, the blending filter means includes a low pass filter which passes all frequencies below the blending frequency and a high pass filter which passes all frequencies above the blending frequency, steering assist means for providing steering assist in response to a control signal, control means operatively connected to the blending filter means for providing said control signal to the steering assist means in response to the blended filtered torque signal, and means whereby high frequency gain of the steering assist system is arranged to be low for on-centre operation of the hand wheel and relatively higher for off-centre operation.

By "on-centre" operation, we mean operation of the steering wheel in operating regions within a few degrees, typically 5–10°, deviation from the straight ahead position and where the driver input torques are relatively small, eg. 1 or 2 Nm (see FIG. 14). "Off-centre" operation means operation of the steering wheel for larger angles and larger driver input torques, for example, 3 to 4 Nm.

In one embodiment, this operation is achieved in that said means enable the gain of the high frequency path via the high pass filter to be adjusted in accordance with the sensed level of applied steering torque so as to be low for on-centre operation of the steering wheel and relatively higher for off-centre operation.

In another embodiment, an additional frequency dependent transfer function is provided in the blending filter means by which the steering system gain is made to vary as a function of the lower frequency filtered component Advantageously, the additional frequency dependent transfer function element comprises a proportional plus differential filter.

In some embodiments, the proportional plus differential filter is positioned after an assist curve means which provides a desired steering torque assist signal having a value functionally related to the low pass applied steering torque and sensed vehicle speed. In other embodiments, the proportional plus differential filter may be positioned in front of the assist curve means. The preferred implementation includes the PD filter in front of the assist curve by using a single gain to couple some of the high frequency output from the blending filters into the low frequency path.

The proportional plus differential filter can be realized by a combination of the low frequency and high frequency components ($T_{SL}$ and $T_{SH}$ wherein the input to the assist curve means is given by $$T_{SL} + \frac{\omega_b}{\omega_z} T_{SH}$$

where $T_{SL}$=The low passed signal
$T_{SH}$the high passed signal
$\omega_b$=blending filter frequency $$\omega_z = \frac{\omega_b G_b |_{off-centre}}{G_\infty |_{off-centre} - G_\infty |_{on-centre}}$$

$G_\infty$=high frequency gain
$G_b$=assist curve (low frequency) gain

Advantageously, the transfer function K(s) of the proportional plus differential filter is of the form:

$$K(s) = 1 + \frac{1}{\omega_z} \cdot s$$

where $\omega_z = \frac{\omega_b G_b |_{off-centre}}{G_\infty |_{off-centre} - G_\infty |_{on-centre}}$ with $|_{on-centre}$ and $|_{off-centre}$ representing preferred "ideal" values and with $\omega_z \omega_b G_b$ and $G_\infty$ as defined hereinafter.

In the present blending filter design, both the low frequency component and the high frequency component set the high frequency gain. This ensures that the high frequency on-centre, and the high frequency off-centre gains can be set uniquely and independently. As the high frequency gain is a function of the low frequency gain, no phase lag is necessarily introduced above the blending frequency and therefore the system stability and driver feel can be appropriately maintained over the whole of the vehicles operating conditions such as with vehicle speed where the high frequency gain can also be arranged to be a function of vehicle velocity.

DETAILED DESCRIPTION OF THE INVENTION

Figure 1:
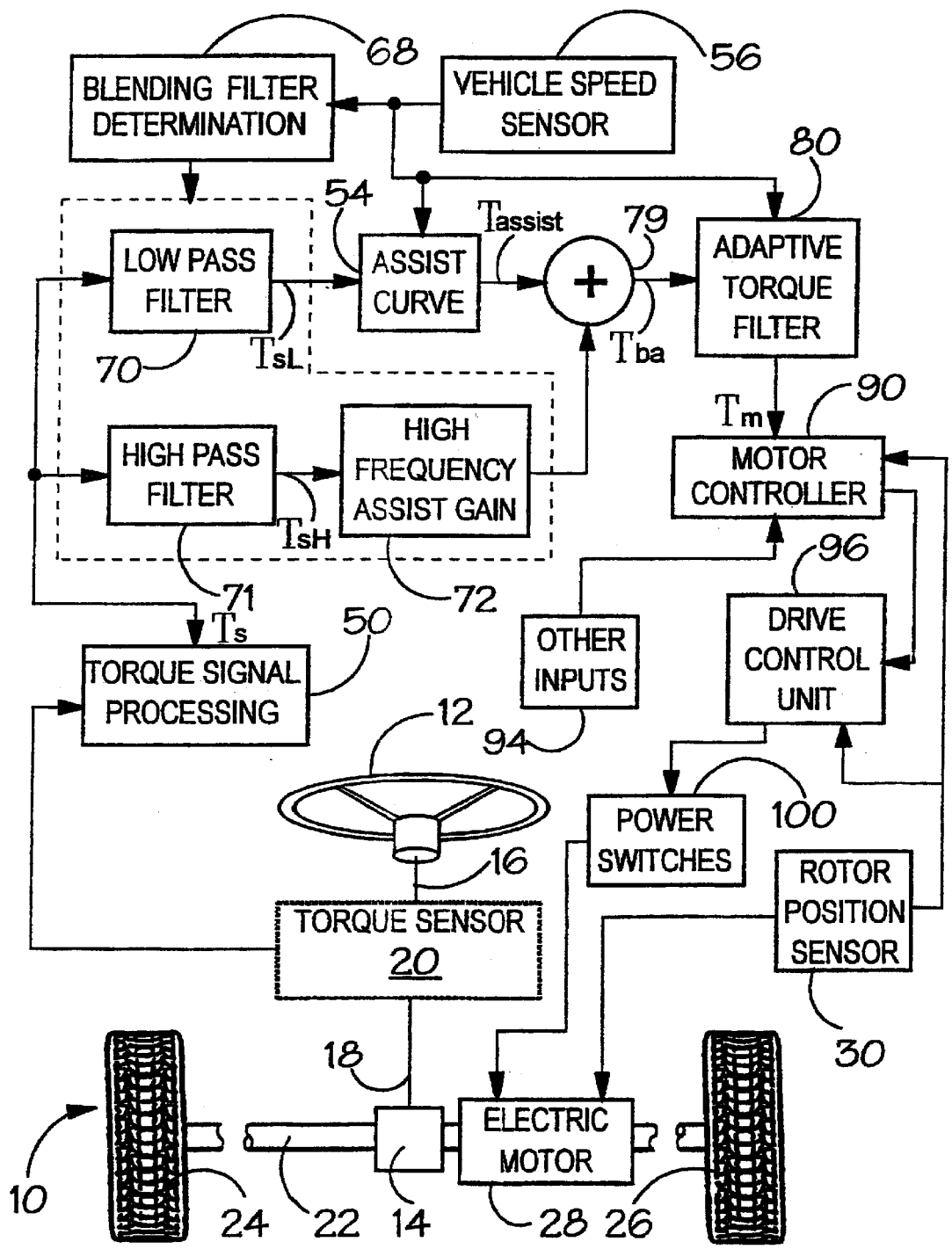
FIG. 1 is a schematic block diagram illustrating a known power assist steering system of a type to which the present invention is applicable.

Referring to FIG. 1, the illustrated power assist steering system 10 includes a steering wheel 12 operatively connected to a pinion gear 14. Specifically, the vehicle steering wheel 12 is connected to an input shaft 16 and the pinion gear 14 is connected to an output shaft 18. The input shaft 16 is operatively coupled to the output shaft 18 through a torque sensor 20.

The pinion gear 14 has helical teeth which-are meshingly engaged with straight cut teeth on a rack or linear steering member 22. The pinion gear 14 in combination with the straight cut gear teeth on the rack member 22 form a rack and pinion gear set. The rack is steerably coupled to the vehicle's steerable wheels 24, 26 with steering linkage in a known manner. When the steering wheel 12 is turned, the rack and pinion gear set converts the rotary motion of the steering wheel 12 into linear motion of the rack 22. When the rack moves linearly, the steerable wheels 24, 26 pivot about their associated steering axes and the vehicle is steered.

An electric assist motor is operatively coupled to a member of the steering mechanism at some appropriate point. Examples include rack drive (U.S. Pat. No. 5,257,828), column drive or pinion drive. When the electric motor 28 is energized, it provides power assist steering so as to aid in the rotation of the vehicle steering wheels 12 by the vehicle operator.

The electric assist motor 28 is energized by a motor controller that includes a means of varying the current flowing through the motor windings or the voltage applied to the windings so as to control the level of assistance that is applied to the steering mechanism. The electric motor may be a brushless permanent magnet type in which the motor controller modulates the motor winding current in accordance with the position of the motor in a manner that is well known in the art The torque sensor 20 is operatively connected between the input shaft 16 and output shaft 18 to provide an electrical signal $T_S$ that is indicative of the applied steering torque. One means for measuring the torque is by the use of a torsion bar which twists in response to applied steering torque thereby permitting relative rotation between the input shaft 16 and the output shaft 18. Stops, not shown, limit the amount of such relative rotation between the input and output shafts in a manner known in the art. The torsion bar has a spring constant referred to herein as $K_i$. The amount of relative rotation between the input shaft 16 and the output shaft 18 in response to applied steering torque is functionally related to the spring constant of the torsion bar. A position sensor is operatively connected across the input shaft 16 and the output shaft 18 and provides an electrical signal having a value indicative of the relative rotational position or relative angular orientation between the input shaft 16 and the output shaft 18. The position sensor in combination with the torsion bar forms the torque sensor 20. The steering wheel 12 is rotated by the driver during a steering maneuver through an angle $\Theta_{HW}$. The relative angle between the input shaft 16 and the output shaft 18 as a result of applied input torque is referred to herein as $\Theta_p$. Taking the spring constant K, of the torsion bar into account, the electrical signal from the sensor 20 is also indicative of the applied steering torque referred to herein as $T_S$.

The output of the torque sensor 20 is connected to a torque signal processing circuit 50. The processing circuit 50 monitors the angle $\Theta_P$ and, "knowing" the spring constant $K_1$ of the torsion bar provides an electric signal indicative of the applied steering torque $T_S$.

The torque sensor signal is passed through a pair of "blending" filters. The two blending filters are constructed such that the first is a low pass filter 70 and the second is a high pass filter 71. The filters are designed such that summation of the two filters is identically one for all frequencies. The low pass filter 70 allows all of the signal $T_S$ with frequency content below some blending frequency ω pass through while rejecting all high frequency data. The high pass filter allows all of the signal $T_S$ with frequency content above some blending frequency $\omega_b$ to pass through while rejecting all low frequency data. The blending filter frequency $\omega_b$ may be accomplished using an actual calculation in accordance with a desired control function. The low pass torque sensor output signal $T_{sL}$ is connected to an assist curve circuit 54.

The assist curve circuit 54 may be a look-up table or an analytical function as described in EP 0947413 that provides a desired torque assist signal $T_{assist}$ having a value functionally related to the low pass applied steering torque $T_{SL}$ and sensed vehicle speed. A vehicle speed sensor 56 is also operatively connected to the assist curve circuit 54 The assist curve function may be accomplished using a look-up table in a microcomputer or may be accomplished using an actual calculation in accordance with a desired control function.

As is well known in the art, the amount of power assist desired for a vehicle steering system decreases as vehicle speed increases. Therefore, to maintain a proper or desirable feel to steering maneuvers, it is desirable to decrease the amount of steering power assist as the vehicle speed increases. This is referred to in the art as speed proportional steering. Hence, the gain of the assist curve "circuit" 54 will normally reduce as the vehicle speed increases.

The high passed torque sensor signal $T_{sH}$ is connected to a high frequency assist gain circuit 72. The high frequency assist gain circuit 72 multiplies the high passed torque sensor signal $T_{sH}$ by a predetermined gain G that is a fiction related to vehicle speed. The determination of $G_\infty$ may be accomplished using a look-up table in a microcomputer or may be accomplished using an actual calculation in accordance with a desired control function.

The outputs of the assist curve circuit 54 and the high frequency assist gain circuit 72 are summed in a summing circuit 79. The output of the summing circuit 79 is referred to as $T_{ba}$ and is connected to an adaptive filter circuit 80. The two signals are combined to determine the input $T_{ba}$ to the adaptive filter circuit.

The adaptive filter circuit 80 filters the input blended assist torque signal $T_{ba}$ The filter is adaptive in that its poles and zeros are allowed to change as the vehicle speed changes so as to provide an optimal control system. The combination of this filtering is referred to as adaptive blending filtering and results in a filtered torque signal $T_m$, which is referred to as the torque demand signal. The torque demand signal is connected to a motor controller 90. The motor controller 90 controls energization of the motor 28 in response to the torque demand signal $T_m$. The motor controller 90 controls steering damping in response to sensed speed of the steering mechanism. Other inputs 94 are connected to the motor controller 90, including an ECU temperature sensor, soft-start circuitry, etc.

The output of the motor controller 90 is connected to a drive control circuit 96. The drive control circuit is controllably connected to a plurality of power switches 100 to control the application of electrical energy to the electric assist motor 28.

Figure 2:
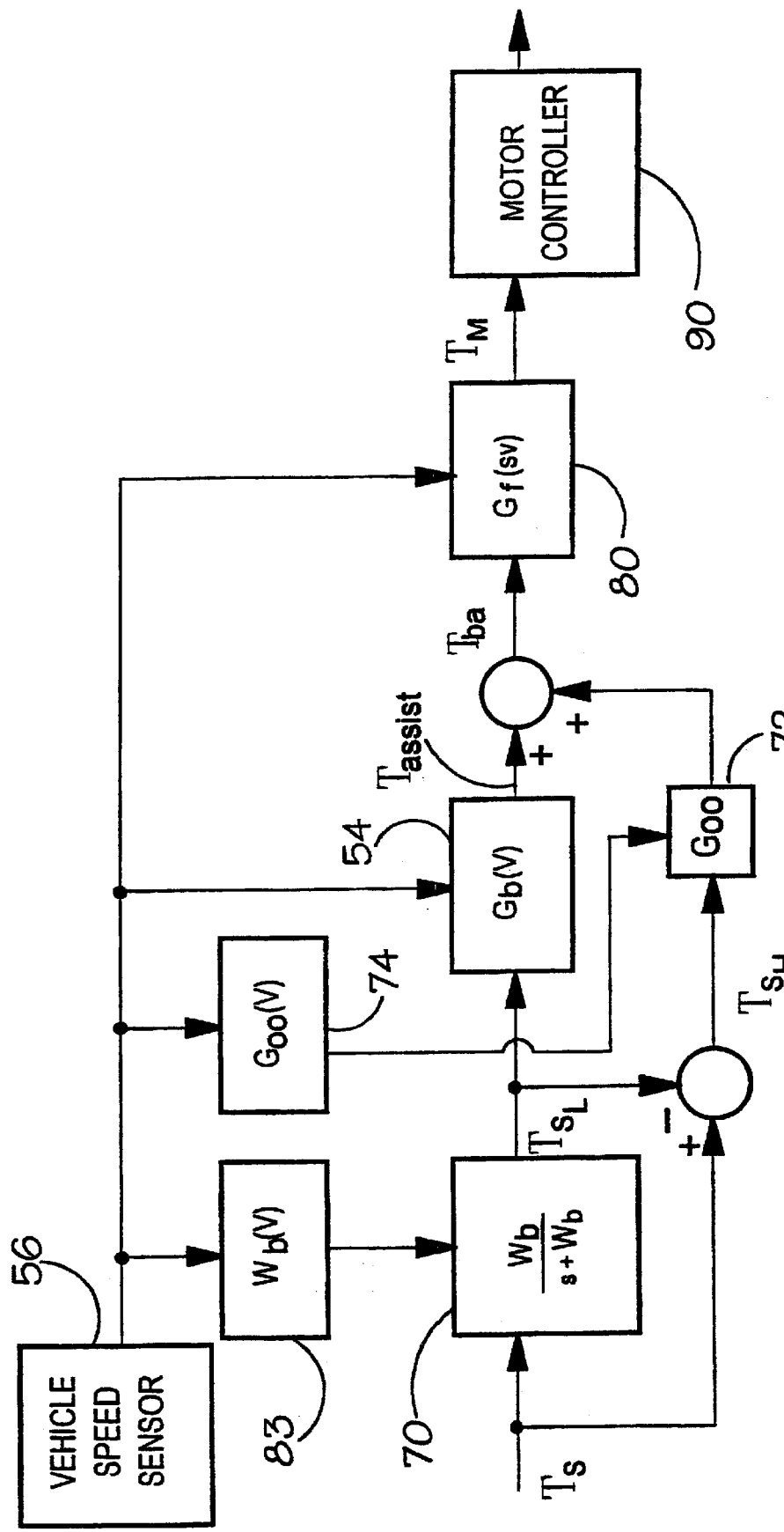
FIG. 2 is a schematic representation of the control loop system of the known steering system of FIG. 1.

Referring to FIG. 2, the closed loop control system of the known system of FIG. 1 is shown again.

A torque applied to the handwheel gives the torque signal $T_S$ that is connected to the low pass/high pass filter circuits.

The torque signal $T_S$ is passed through the low pass filter 70 resulting in the low passed assist torque $T_{sL}$. The high passed assist torque $T_{sH}$ is determined by subtracting the low frequency assist torque from the torque signal $T_S$. The reason that $T_{sH}$ can be determined in this way is discussed below.

The continuous domain blending filters are chosen such that the sum of the low pass filter $G_L(s)$ and the high pass filter $G_L(s)$ is always equal to one:

$$G_L(s) + G_H(s) = 1$$

where F(s) is the Laplace transform of f(t).

The low pass filter is preferably chosen to be a first order filter with a pole at $\omega_b$. The low pass filter pole $\omega_b$ may be computed as a function of vehicle speed by using circuit 83.

The high pass filter is uniquely defined by the above constraint that the sum of the two filters must equal 1. Therefore, the transfer functions of the low and high pass filters are given by:

$$G_L(s) = \frac{\omega_b}{s + \omega_b}$$

$$G_H(s) = \frac{s}{s + \omega_b}$$

When realizing a set of blending filters in a digital computer, those skilled in the art will appreciate that it is not necessary to construct separate high and low pass filter stages. Rather, the input to the blending filters $T_S$ is passed through the low pass filter resulting in the signal $T_{SL}$. The high passed signal is the original input torque minus the low passed portion:

$$T_{sH} = T_s - T_{SL}$$

This can be thought of equivalently as determining the low frequency portion of the signal and simply subtracting it out of the original signal. The result is a signal with only high frequency information. Alternatively, one can use higher order blending filters. However, the complexity of the filter computations increases with filter order in a digital computer. The use of first order filters is preferred.

The low passed torque signal $T_{SL}$ is connected to assist curve circuit 54. Referring again to FIG. 2, the linearized control system includes an assist curve circuit 54 designated as $G_b(v)$.

In the steering system, the low passed torque $T_{SL}$ is passed through the assist curve to determine $T_{assist}$. The low passed assist value $T_{assist}$ is summed with the high passed assist value. The high passed assist value is determined by multiplying the high passed torque sensor signal $T_{sH}$ times the high frequency assist gain $G_{28}$. The blended assist is:

$$T_{ba} = T_{assist} + G_{28} T_{SH}$$

The pole of the blending filter cob and the high frequency assist gain G are computed as functions of speed in circuits 83 and 74 respectively. The determination of ($\omega_b$ and $G_{28}$ may be accomplished using a look-up table in a microcomputer or may be accomplished using actual calculations. The circuits 83 and 74 in the control system of FIG. 2 form the blending filter determination circuit 68 of FIG. 1. The blended assist is connected to the adaptive torque filter $G_f$ which allows the vehicle steering system to adapt to changes in the dynamics of the system that occur as the vehicle speed changes.

The output from the adaptive torque filter 80 is a torque demand signal $T_m$. The motor provides a torque assist which is summed with the manual assist transmitted through the pinion shaft producing a total force on the rack.

The system described thus far is known from our earlier U.S. Pat. No. 5,504,403. As described above, in the known system, the high frequency assist gain $G_{28}$ established at block 72 in FIGS. 1 and 2 is essentially a constant value for a given vehicle speed. However, it has been determined experimentally that different high frequency assist gains are required to get good performance when driving with the steering wheel on-centre and when driving with the steering wheel off-centre, respectively.

Figure 3:
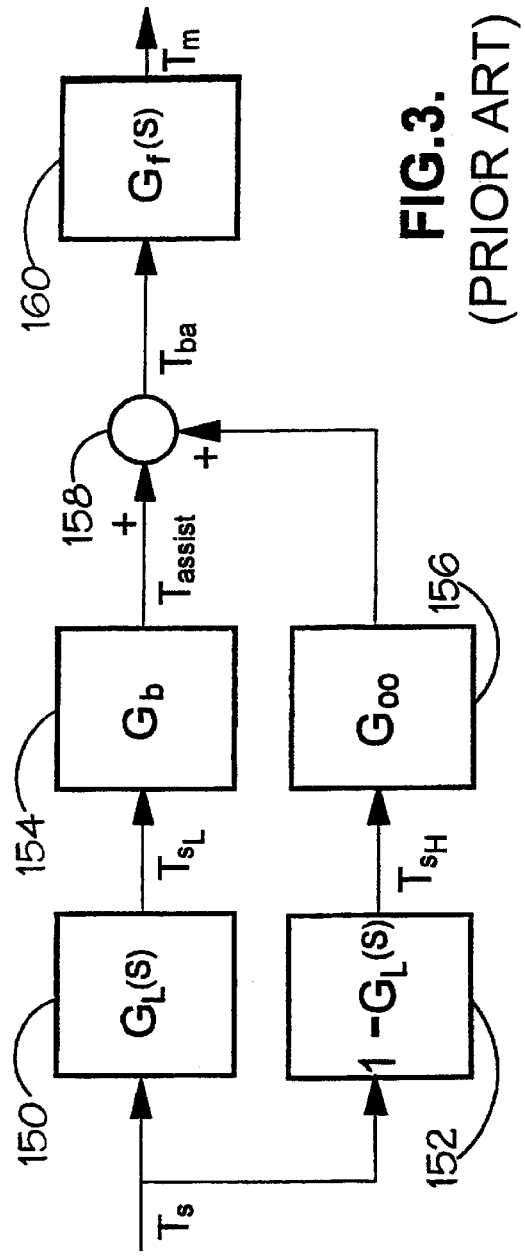
FIG. 3 is a simplified block diagram of a known torque compensator used in the system of FIG. 1.

FIG. 3 shows a linearized version of the compensation circuit of FIGS. 1 and 2 which comprises a frequency filter 150, 152 that separates the measured column torque $T_S$ into high frequency and low frequency parts, the boost curve 154 that is applied to the low frequency content and a gain ($G_\infty$) 156 that is applied to the high frequency content. The low and high frequency paths are then added at 158 and passed through an adaptive torque filter 160. This filter provides phase advance to stabilize the loop. In the linearized version, none of the functions are vehicle speed related. Typically, the frequency filter is implemented using a single low pass filter.

Thus, $$G_L(s) = \frac{\omega_b}{s + \omega_b}$$

The gain $G_b$ is the local derivative of the assist function with respect to the input torque evaluated at some low passed input torque and speed.

$$G_b = \frac{\delta T_{assist}}{\delta T_{SL}}$$

The gain $G_b$ represents how much incremental $T_{assist}$ is provided for an incremental change in low passed input torque $T_{SL}$ about some nod low passed input torque and vehicle speed.

The torque filter transfer function is $G_\infty(s)$.

In practical high speed tuning tests, it has been established that good on-centre feel can be obtained with a relatively low value of G (e.g. 6) and a frequency split at 4 Hz. When on-centre, the assist curve gain is locally zero. However, with this setting of $G_\infty$, the off-centre feel is poor and has a pronounced lag in the response. On the other hand, good off-centre feel can be obtained with a higher value of $G_\infty$ (eg. 20) and a frequency split at 4 Hz. Changing the split frequency does not provide any significant benefit in these circumstances. Typically the local gain of the assist curve in the centre is around 10.

Figure 4A:
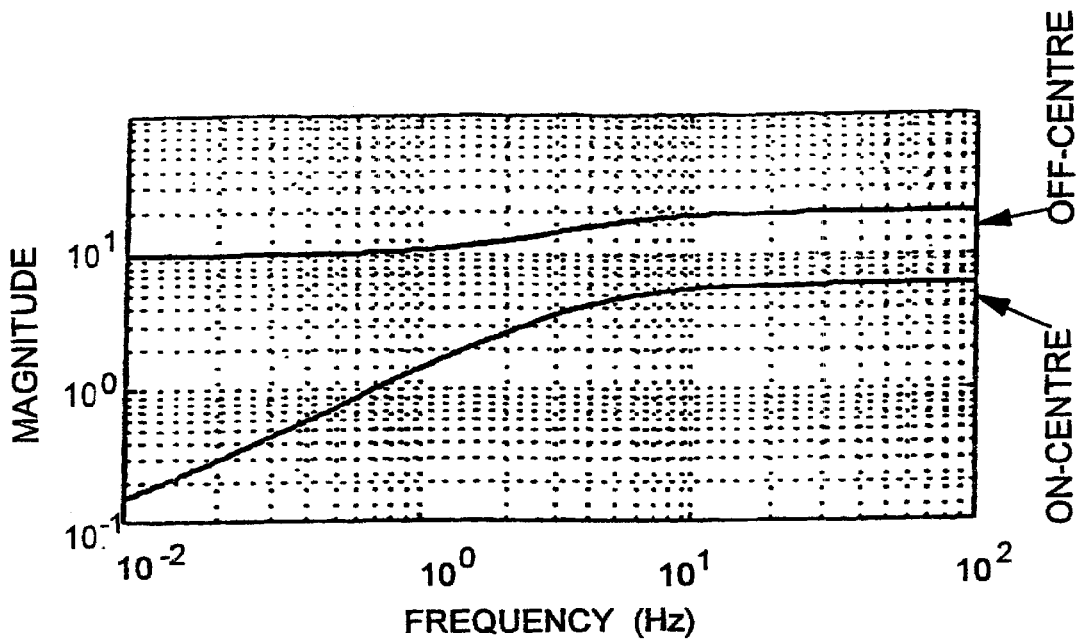
FIGS. 4a and 4b show frequency response characteristics for optimized on-centre and off-centre behaviour.
Figure 4B:
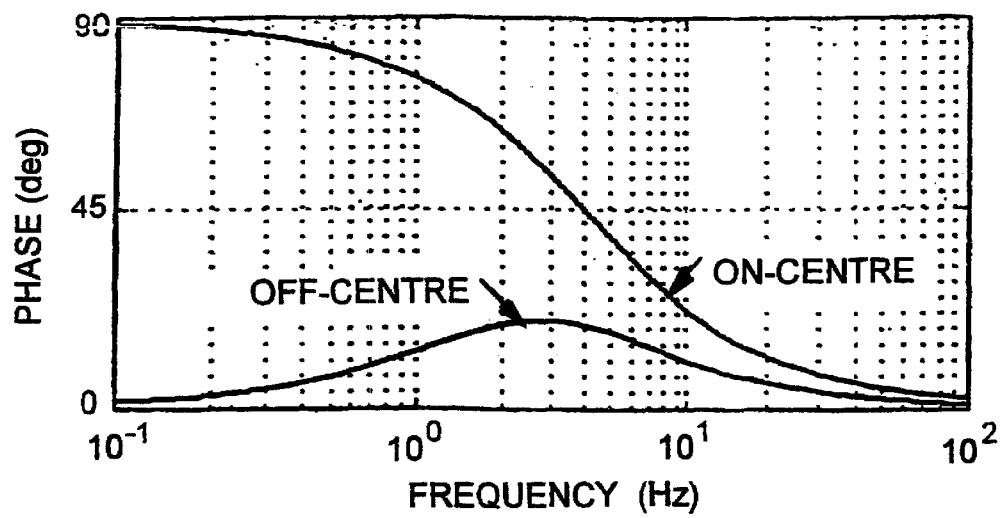

Frequency responses of the linearized centered system for the aforegoing two settings are shown by way of example in FIGS. 4a and 4b.

It is apparent from these responses that a good on-centre response requires a relatively inactive steering system to allow the driver to feel the centre but, in contrast, a good off-centre response needs more gain to avoid a sluggish feeling.

It is therefore required for the compensator structure to be altered to allow the best on-centre and off-centre settings to be achieved simultaneously.

A presently preferred option for achieving this operation is to insert an additional frequency dependent block within the low frequency path, the effect of which is to provide an additional high frequency component derived from the low frequency gain which increases the overall high frequency gain of the steering assist system. This component will depend inherently on the assist curve gain which, in turn will vary with the low frequency torque level. An example of how this additional frequency dependent block can be established is now described.

The following nomenclature is used in the description which follows:

$G_L(s)$: transfer function of low-pass filter
$G_H(s)$: transfer function of high-pass filter
(= $1 - G_L(s)$)
$H_t(s)$: overall transfer function of compensator (excluding torque filter)
$K(s)$: additional component in low-frequency path
$\omega_b$: blending filter frequency
$\omega_z$: frequency of additional zero in $K(s)$
$G_b$: assist curve (local low-frequency) gain
$G\infty$: the high-frequency gain The transfer functions of the low and high pass filters are:

$$G_H(s) = 1 - G_L = \frac{s}{s + \omega_b}$$

The table below shows the desired parameters and the consequent transfer functions, based on the abovementioned example

|  | Desired on-centre | Desired off-centre |
|---|---|---|
| $G_b$ | 0 | 10 |
| $\omega_b$ | $2\pi \times 4$ | $2\pi \times 4$ |
| $G_\infty$ | 6 | 20 |
| $H_t(s)$ | 6 $H_H(s)$ | 10 $H_L(s)$ + 20 $H_H(s)$ |

Figure 5:
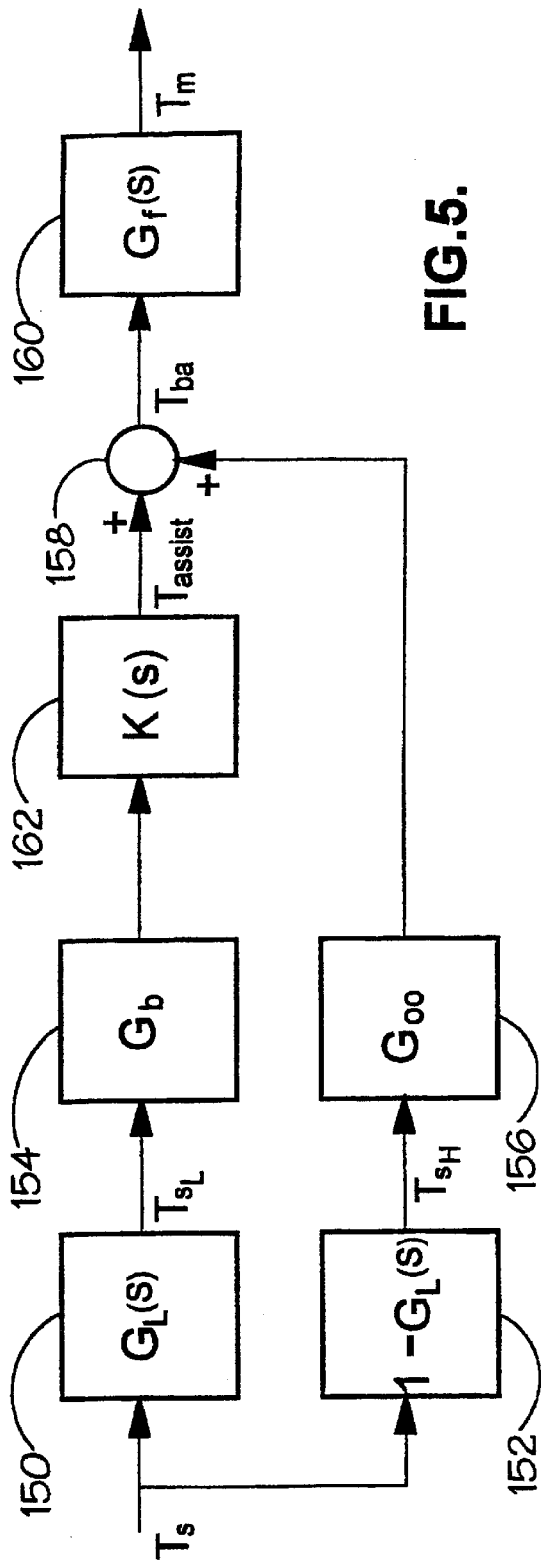
FIG. 5 is a simplified block diagram of a modified torque compensator in accordance with the present invention.

The modified compensator structure is shown in FIG. 5. The additional transfer function, K(s), is added to the low-frequency path as shown by block 162. It is assumed that is will have a vehicle-speed dependent gain.

The K(s) that is needed to achieve both the on-centre and off-centre transfer functions can be calculated as follows: Assume that the high-frequency path is unchanged and the assist curve gain is zero when on-centre; thus $G_\infty$ must take on the value needed to get the desired on-centre characteristic (i.e. $G_\infty$ 6). The blending filter frequency is the same for both desired characteristics. The desired off-centre response has $G_b$ of 10 and ideal $G_\infty$ of 20 is:

$$Ht(s)_{off\ centre} = 10 G_L(s) K(s) + 6 G_H(s)$$

$$\Rightarrow K(s) = \frac{10 G_L(s) + 1.4 G_H(s)}{10 G_L(s)}$$

$$= 1 + \frac{1.4 G_H(s)}{G_L(s)}$$

$$= 1 + 1.4 \left( \frac{\frac{s}{(s + \omega_b)}}{\frac{\omega b}{(s + \omega_b)}} \right)$$

$$= 1 + \frac{1.4 s}{\omega_b}$$

Thus K(s) takes the form of a proportional+differential (P+D) filter. In general, let K(s) be:

$$K(s) = 1 + \frac{s}{\omega_z}$$

with a proportional gain of 1 and a derivative gain of $$\frac{1}{\omega_z}$$

$$where: \omega_z = \frac{\omega_b G_b|_{off-centre}}{G_\infty|_{off-centre} - G_\infty|_{on-centre}}$$

with $|_{on-centre}$ and $|_{off-centre}$ indicating the "ideal" values given in the table above. With the particular values tabled above, the derivative gain $(1/\omega_z$, is $1.4/(2\times\pi\times4)=0.557\approx1/18$, i.e. $\omega_z=2.86$ Hz.

To restore the existing characteristic at low vehicle speeds, the derivative gain of K(s) must be zero when the vehicle is stationary.

Figure 6A:
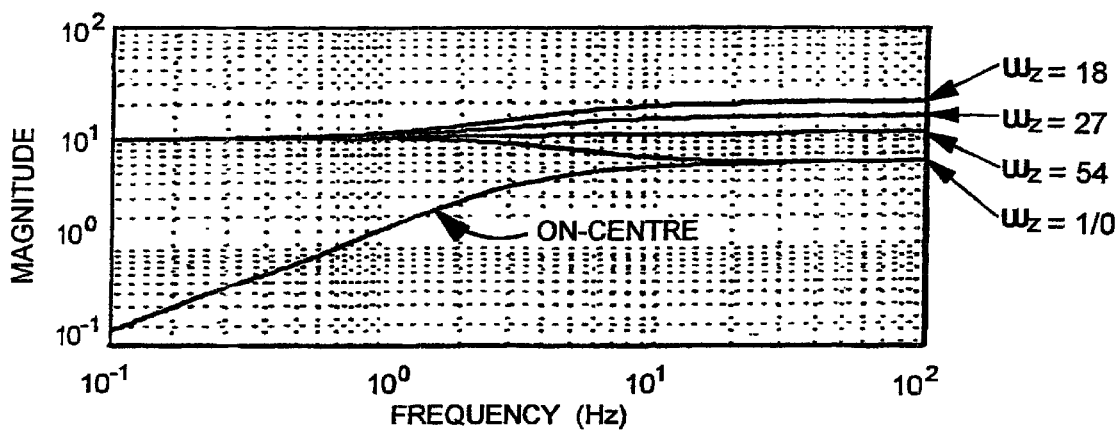
FIGS. 6a and 6b show frequency response characteristics for a system embodying a P+D filter in accordance with an embodiment of the present invention.
Figure 6B:
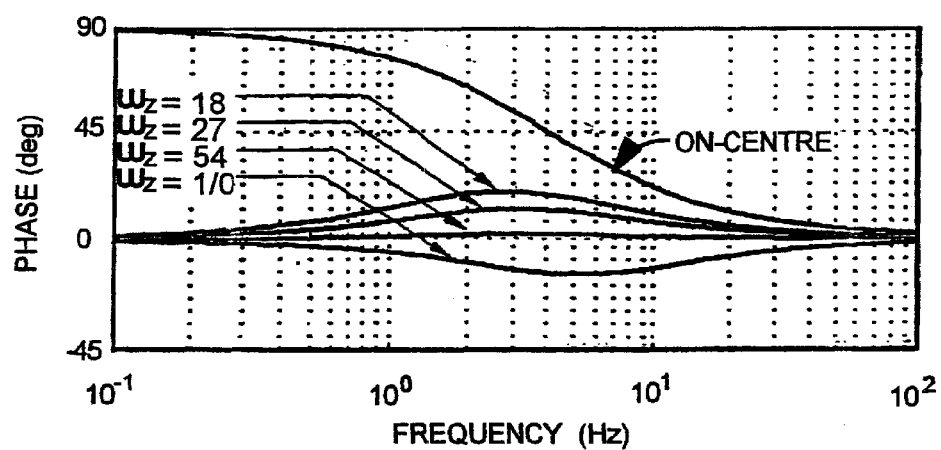
Figure 7:
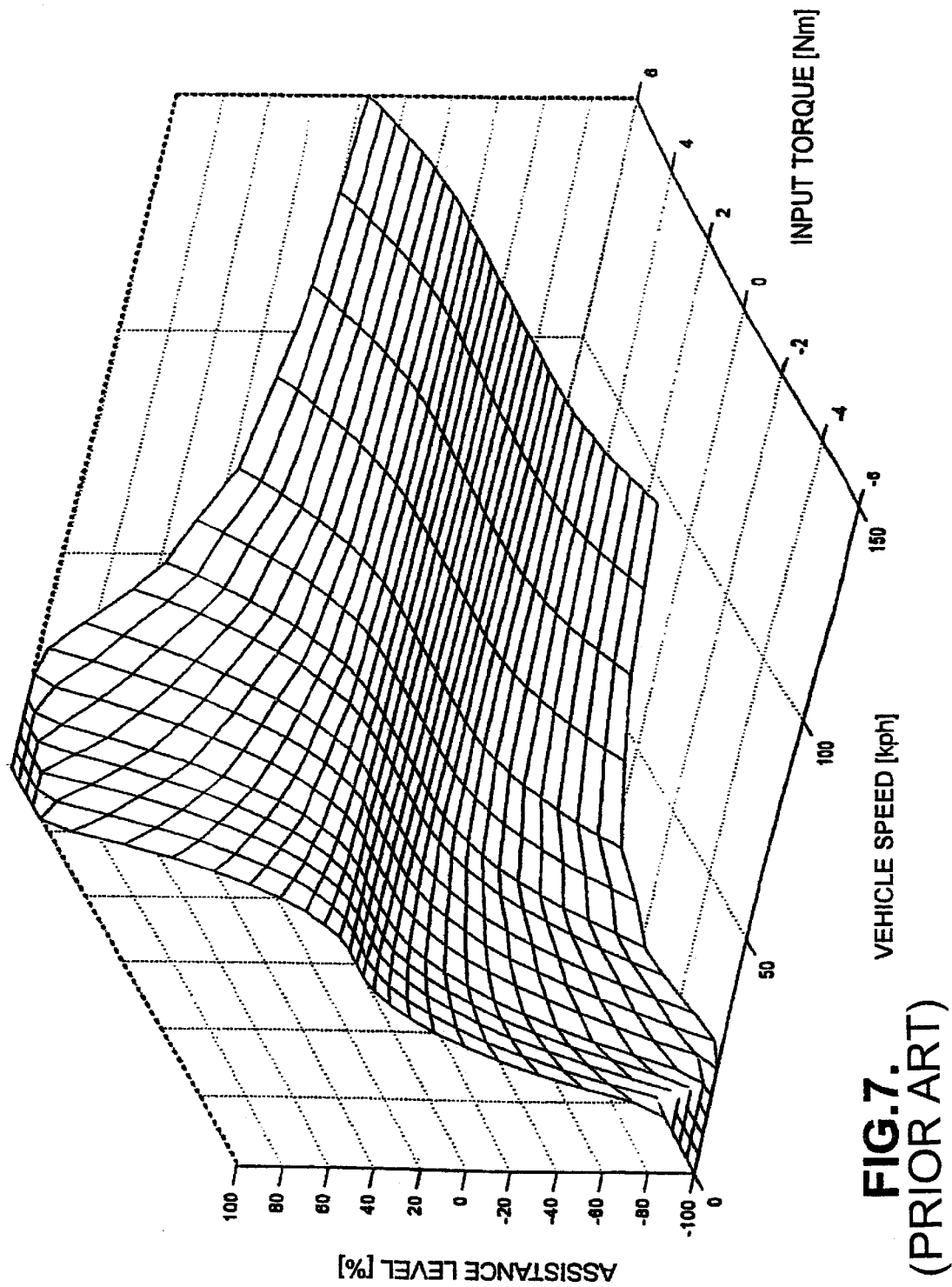
FIG. 7 shows a typical assist curve.

The effect of the P+D filter can be considered in frequency terms. The filter will only affect the off-centre response. FIGS. 6a and 6b show how the off-centre frequency response varies with the derivative gain (=1/$\omega_z$). The on-centre response is also shown.

Although the analysis has been carried out in the continuous time domain, those skilled in the art will appreciate that all of the continuous time functions can be implemented in a sampled data system provided that the sampling frequency is sufficiently high. The mapping from continuous time to digital filters is well known and can be performed for example by a pole-zero mapping in which continuous time poles P and zeros Z are mapped to discrete time poles P and zeros Z via $$P = \exp(P_{\Delta t}), Z = \exp(Z_{66\ t})$$

where $_\Delta t$ is the sampling period.

The P+D element can be located before or after the assist curve. The location will affect the filter response because the assist curve is a nonlinear component.

Referring again to FIG. 2, the low pass filter $G_L$, high pass filter $G_H$ and filter $G_F$ are given by:

$$G_L(s) = \frac{\omega_b}{s + \omega_b}$$

$$G_H(s) = \frac{s}{s + \omega_b}$$

$G_F(s)$ is a notch filter, for example $$G_F(s) = \frac{(s + 40)^2}{(s + 4)(s + 400)}$$

Note that the notch filter $G_F(s)$ can be arranged to have complex zeros and/or poles.

Figure 9:
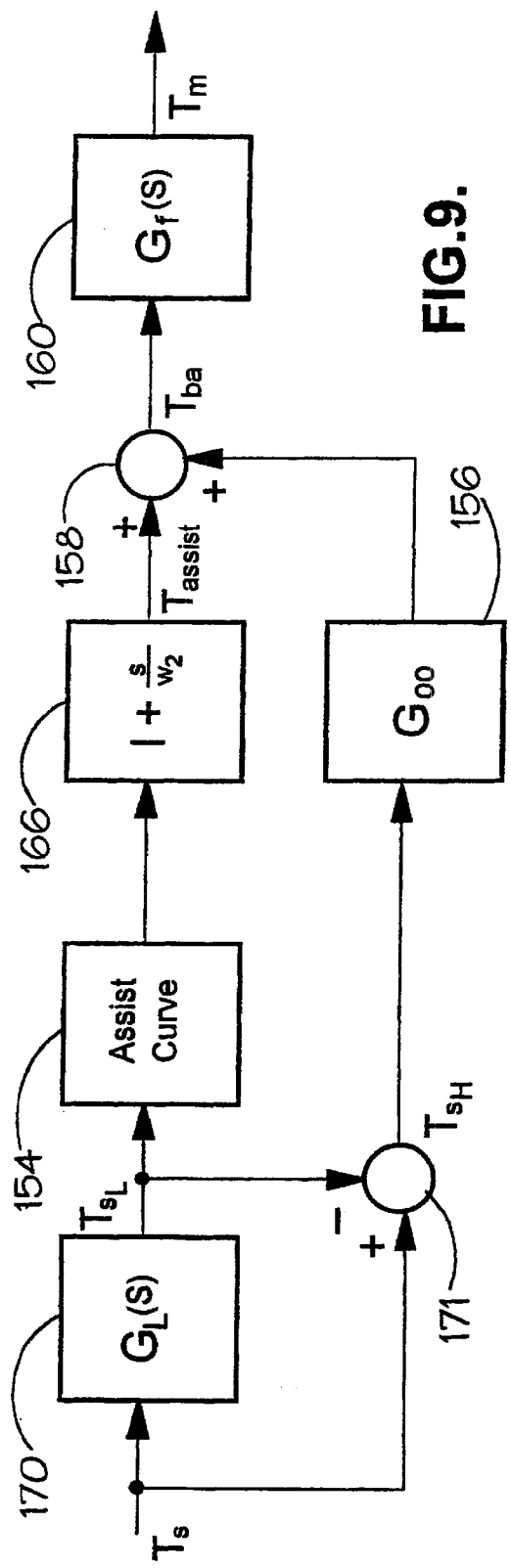
FIG. 9 shows an arrangement in accordance with the present invention, with a P+D element disposed after the assist curve.

FIG. 9 shows one possible realization of the controller and the PD element 166 and with the high frequency component of the torque sensor input $T_{SH}$ being calculated in the same manner as FIG. 2, ie. by subtracting the low frequency components $T_{SL}$ from the input $T_S$ using the subbing element 171. For clarity, the effect of vehicle speed is omitted from FIG. 9 but as with the technique shown in FIG. 2, the following elements can be altered with vehicle speed: $\omega_b$, the assist curve, $G_\infty$, $G_F(S)$ and the new derivative term $\omega_z$.

Figure 10:
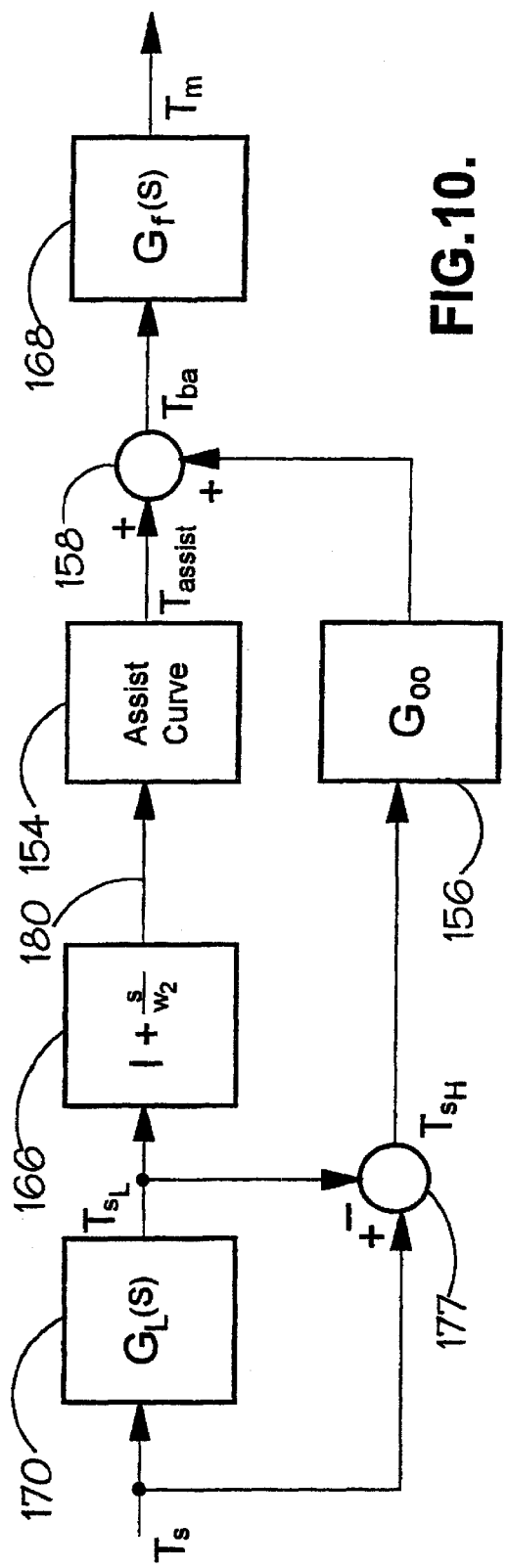
FIG. 10 shows an arrangement in accordance with the present invention, with a P+D element disposed in front of the assist curve.

FIG. 10 shows the arrangement of FIG. 2 with the added improvement of a P+D element in accordance with one embodiment of the present invention disposed in front of the assist curve 154.

Figure 8:
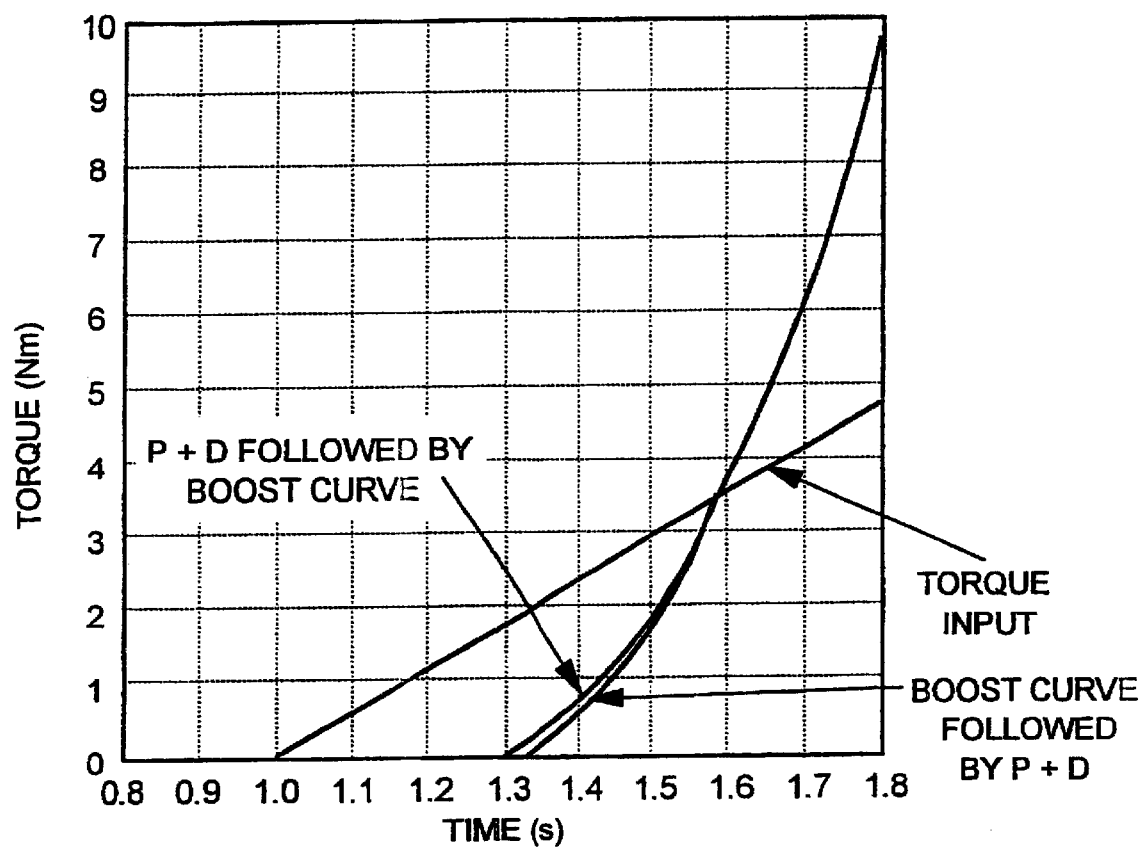
FIG. 8 shows an example of the response of the P+D and assist curve to a ramp input.

FIG. 8 shows an example with a ramp input to the boost curve and the P+D element (D gain=1/18). The figure shows that there is only a very slight difference in the overall response in this particular case.

A benefit of placing the P+D element in the signal flow before the assist curve is that a simplification can be made. In FIG. 10 the low pass path to point 180 go is given by:

$$\left(1 + \frac{s}{\omega_z}\right) G_L(s) = \left(1 + \frac{s}{\omega_z}\right)\left(\frac{\omega_b}{s + \omega_b}\right)$$

$$\left( = \left(\frac{\omega_b}{s + \omega_b}\right)\right) + \left(\left(\frac{\omega_b}{\omega_z}\right)\left(\frac{s}{s + \omega_b}\right)\right)$$

$$= G_L(s) + \left(\frac{\omega_b}{\omega_z}\right) G_H(s)$$

Figure 11:
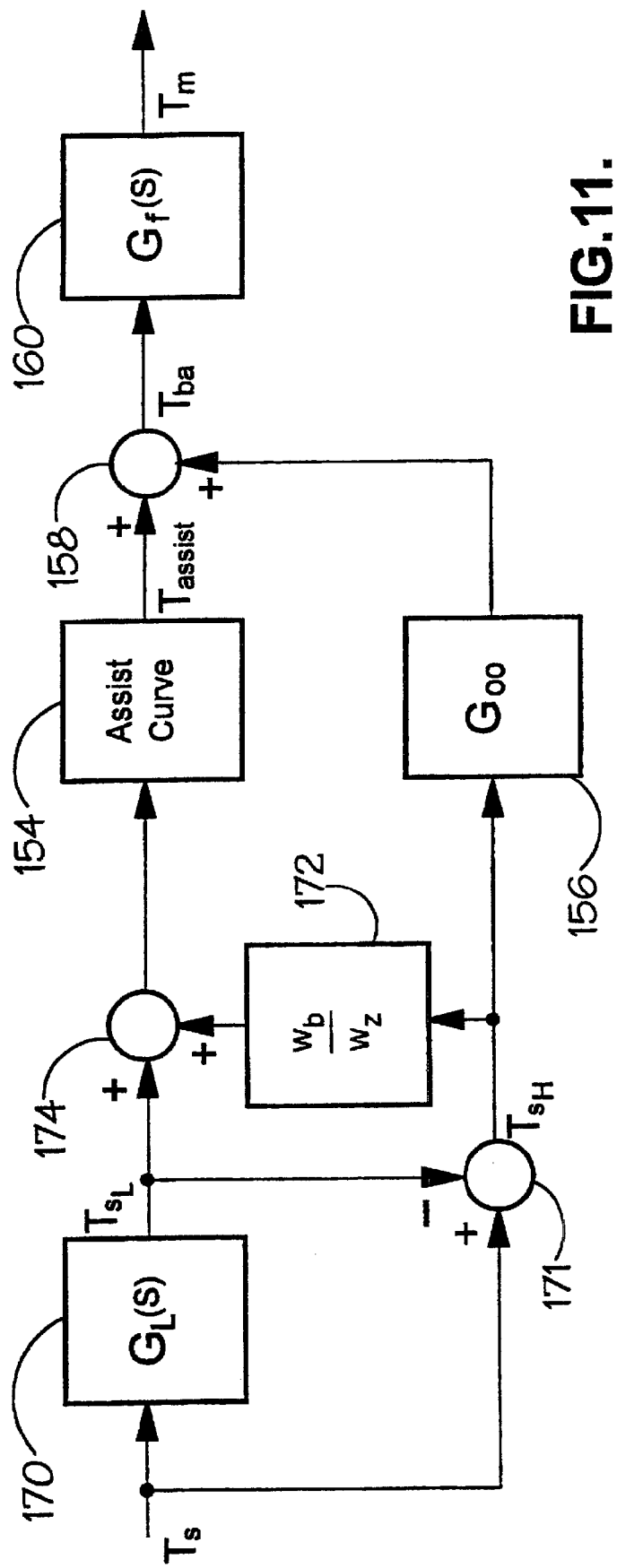
FIG. 11 shows a means of realizing the arrangement of FIG. 10.

Thus the P+D element can be realized by using a combination of the low frequency and high frequency components $T_{SL}$ and $T_{SH}$. This can be realized as shown in FIG. 11 in which the P+D element has been replaced by a gain block 172 and a summation element 174.

In operation, the high frequency component will be present in the blending filter output $T_{ba}$ two paths. The first, as shown in FIG. 2 onwards is via the gain element $G_\infty$. The second is shown in FIGS. 5, 9, 10 and 11 and is via the gain element $$\left(\frac{\omega_b}{\omega_z}\right)$$

and the local gain of the assist curve $G_b$. The local gain of the assist curve will depend on the low frequency component $T_{SL}$ and will vary continuously between on-centre and off-centre operation.

Figure 12A:
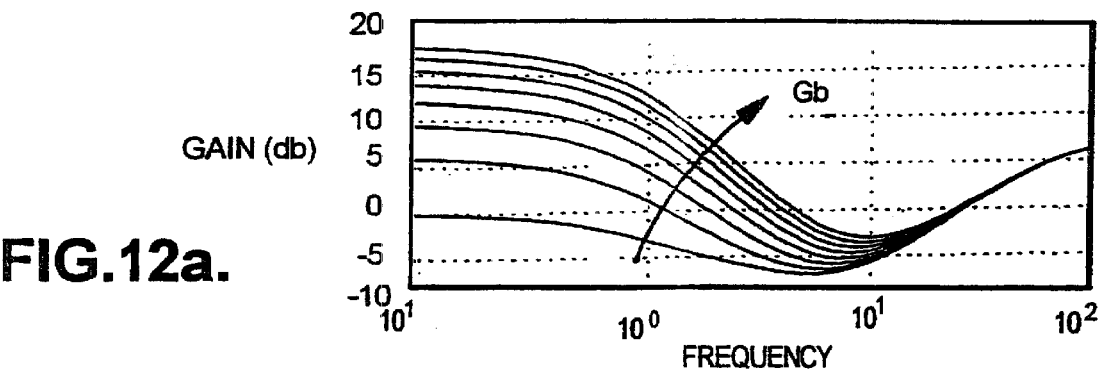
FIGS. 12a and 12b illustrate respectively gain v frequency characteristics for the known blending structure and a structure in accordance with the present invention, where $\omega_z$ (as defined hereinafter)=∞; and the linear assist centre gain $G_b$ (as defined hereinafter is varied)
Figure 12B:
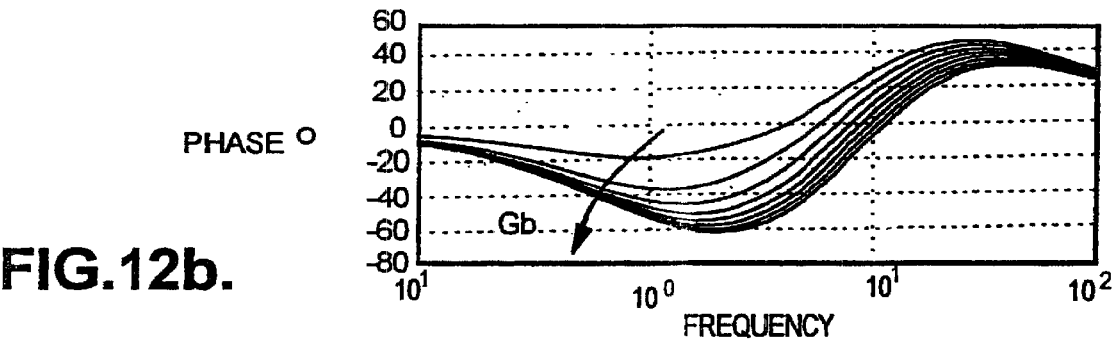
Figure 13A:
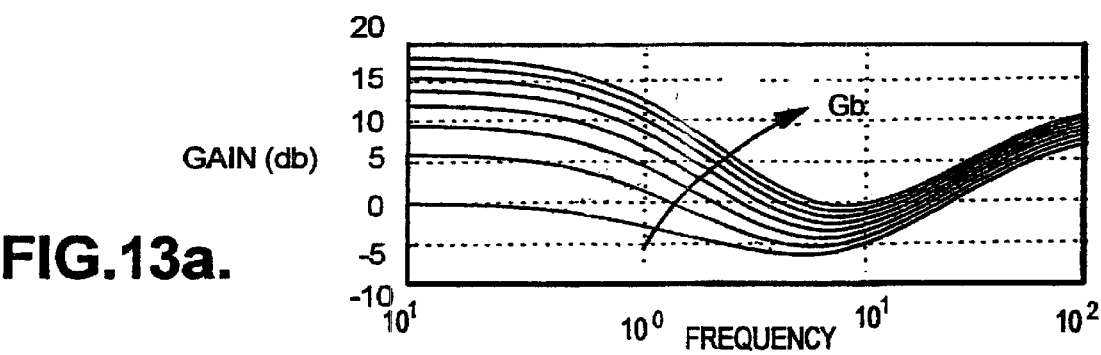
FIGS. 13a and 13b illustrate respectively gain v frequency characteristics for the known blending structure and a structure in accordance with the present invention, where $$\omega_z = \frac{\omega_b}{s} \text{ and}$$
Figure 13B:
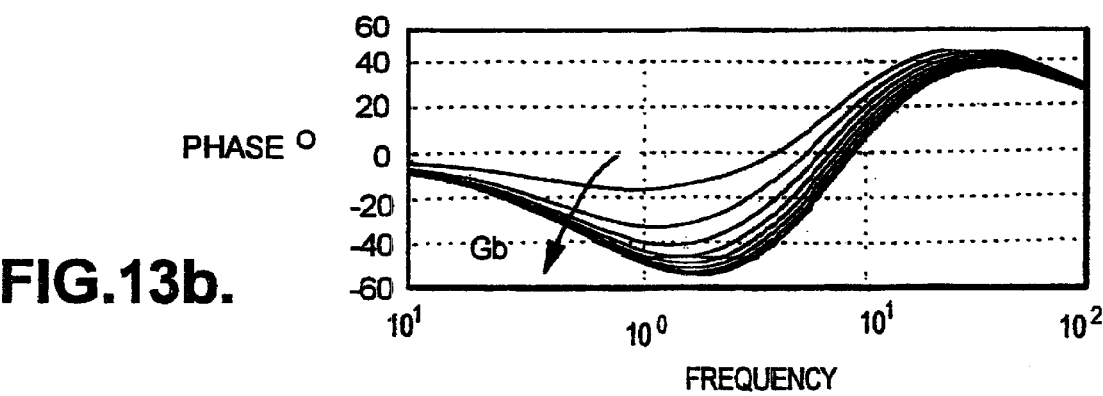
Figure 14:
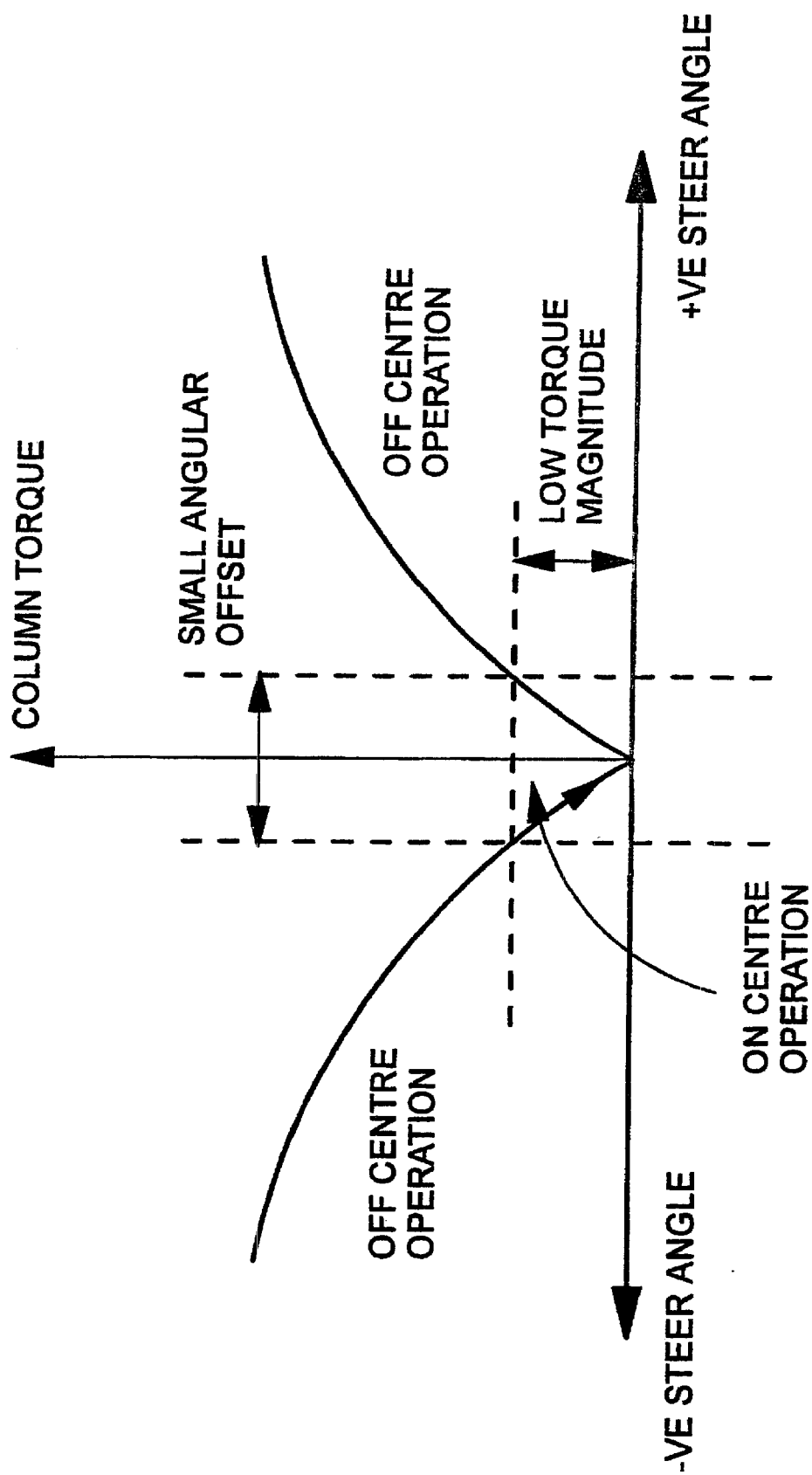
FIG. 14 illustrates "on-centre" and "off-centre" operation of the system.

Finally, FIGS. 12a and 12b illustrate respectively gain and phase v. frequency characteristics for the known blending structure and a structure in accordance with $\omega_z=\infty$ and the linearized assist centre gain $G_b$ is varied. FIGS. 13a and 13b illustrate respectively gain and phase v. frequency characteristics for the known blending structure and a structure in accordance with one embodiment of the present invention, wherein $$\omega_z = \frac{\omega_b}{s}$$

and the locally increased assist curve gain is varied. It can be seen from these figures that the high frequency gain is constant in the known structure and varies with $G_b$ in the new structure. The amount of variation is controlled by the parameter $\omega_z$.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for controlling an electric steering assist system, which system provides assist in response to a steering control signal, the apparatus comprising:
    torque sensing means operatively connected to a vehicle hand wheel for providing a torque signal indicative of applied steering torque, blending filter means connected to the torque sensing means for providing a blended filtered torque signal having a first frictional characteristic at torque frequencies less than a blending frequency and a second functional characteristic at torque frequencies greater than the blending frequency, the blending filter means including a low pass filter which passes all frequencies below the blending frequency and a high pass filter which passes all frequencies above the blending frequency, steering assist means for providing steering assist in response to a control signal, control means operatively connected to the blending filter means for providing said control signal to the steering assist means in response to the blended filtered torque signal, and means whereby high frequency gain of the steering assist system is arranged to be low for on-centre operation of the hand wheel and relatively higher for off-centre operation.

2. An apparatus as claimed in claim 1, wherein said means enable the gain of the high frequency path via the high pass filter to be adjusted in accordance with the sensed level of applied steering torque so as to be low for off-centre operation of the steering wheel and relatively higher for off-centre operation.

3. An apparatus as claimed in claim 1, wherein said means include an additional frequency dependent transfer function within the blending filter means by which the steering system gain is made to vary as a function of the lower frequency filtered component, such that the steering assist high frequency gain is low for on-centre operation of the hand wheel and relatively higher for off-centre operation.

4. An apparatus as claimed in claim 3, wherein said additional frequency dependent transfer function is derived by means of a frequency dependent element within the low frequency path which provides an additional high frequency component derived from the low frequency gain which is added to the high frequency gain derived from the high frequency path so as to increase the overall high frequency gain of the steering assist system.

5. An apparatus as claimed in claim 3 wherein the additional frequency dependent transfer function element comprises a proportional plus differential filter.

6. An apparatus as claimed in claim 5, wherein the proportional plus differential filter is positioned after an assist curve means which provides a desired steering torque assist signal having a value functionally related to the low pass applied steering torque and sensed vehicle speed.

7. An apparatus as claimed in claim 5, wherein the proportional plus differential filter is positioned before an assist curve means which provides a desired steering torque assist signal having a value functionally related to the low pass applied steering torque and sensed vehicle speed.

8. An apparatus as claimed in claim 7, wherein the proportional plus differential filter is achieved, using a single gain to couple some of the high frequency output from the blending filters into the low frequency path.

9. An apparatus as claimed in claim 5 wherein the proportional plus differential filter is realized by a combination of the low frequency and high frequency components wherein the input to the assist curve means is given by:

$$\text{Input} = T_{SL} + [\omega_b/\omega_z]^* T_{SH}$$

Where
$T_{SL}$=the low passed signal
$T_{SH}$=the high passed signal
$\omega_b$=blending filter frequency
$\omega_z = [\omega_b{}^*G_b|_{\textit{off-centre}}]/[G_\infty|_{\textit{off-centre}} - G_\infty|_{\textit{on-centre}}]$
$G_\infty$=high frequency gain
$G_b$=assist curve (low frequency) gain.

10. An apparatus as claimed in claim 5, wherein the proportional plus differential filter has a transfer function K(s) of the form:

$$(s) = 1 + \frac{1}{\omega_z} \cdot s$$

$$\text{where } \omega_z = \frac{\omega_b G_b|_{\textit{off-centre}}}{G_\infty|_{\textit{off-centre}} - G_\infty|_{\textit{on-centre}}}$$

with $|_{\textit{on-centre}}$ and $|_{\textit{off-centre}}$ representing preferred "ideal" values $\omega_b$=blending filter frequency
$G_\infty$=high frequency gain
$G_b$ =assist curve (low frequency) gain.

11. A method of controlling an electric steering assist system, which system provides assist in response to a steering control signal, the method comprising the steps of:
    (a) measuring the steering torque applied to a vehicle hand wheel for establishing a torque signal indicative of applied steering torque;
    (b) filtering the torque signal in a blending filter means connected to the torque measuring means for establishing a blended filtered torque signal having a first functional characteristic at torque frequencies less than a blending frequency and a second functional charac teristic at torque frequencies greater than the blending frequency, the blending filter including a low pass filter which passes all frequencies below the blending frequency and a high pass filter which passes all frequencies above the blending frequency;

(c) providing steering assist in response to a control signal, controls means operatively connected to the blending filter means deriving said control signal for the steering assist means in response to the blended filtered torque signal; and (d) controlling the steering assist system high frequency gain so as to be low for on-center operation of the hand wheel and relatively higher for off-center operation.

12. A method as claimed in claim 11, wherein the gain of the high frequency path via the high pass filter is adjusted in accordance with the sensed level of applied steering torque so as to be low for on-centre operation of the steering wheel and relatively higher for off-centre operation.

* * * * *

UNITED STATES PATENT AND TRADEMARK OFFICE
CERTIFICATE OF CORRECTION

PATENT NO.   : 6,631,781 B2
DATED        : October 14, 2003
INVENTOR(S)  : Andrew James Stephen Williams et al.

It is certified that error appears in the above-identified patent and that said Letters Patent is hereby corrected as shown below:

<u>Column 11,</u>
Line 39, delete "frictional" and insert -- functional --.
Line 58, delete "off-centre" and insert -- on-centre --.

<u>Column 12,</u>
Line 45, before the "(s)" insert -- K --;
Line 47, delete "$\omega_b G_b$" and insert -- $\omega_b \cdot G_b$ --.

Signed and Sealed this

Twentieth Day of January, 2004

JON W. DUDAS
*Acting Director of the United States Patent and Trademark Office*